(12) United States Patent
Denton

(10) Patent No.: US 6,711,496 B2
(45) Date of Patent: Mar. 23, 2004

(54) SYSTEM AND METHOD OF MONITORING CARGO CONTAINER MOBILITY AND EFFICIENCY

(76) Inventor: Jack A. Denton, 386 Hwy. 6 W., Tupelo, MS (US) 38801

( * ) Notice: Subject to any disclaimer, the term of this patent is extended or adjusted under 35 U.S.C. 154(b) by 0 days.

(21) Appl. No.: 10/040,338

(22) Filed: Nov. 1, 2001

(65) Prior Publication Data

US 2003/0083815 A1 May 1, 2003

(51) Int. Cl.$^7$ .............................. G01S 5/02; G06F 17/40
(52) U.S. Cl. ........................ 701/207; 701/213; 701/35; 342/357.07
(58) Field of Search ................................ 701/207, 213, 701/35; 342/357.07

(56) References Cited

U.S. PATENT DOCUMENTS

| | | | | |
|---|---|---|---|---|
| 4,745,564 A | * | 5/1988 | Tennes et al. | ............... 702/141 |
| 5,119,102 A | | 6/1992 | Barnard | |
| 5,337,243 A | | 8/1994 | Shibata et al. | |
| 5,712,789 A | * | 1/1998 | Radican | ....................... 700/226 |
| 5,719,771 A | * | 2/1998 | Buck et al. | .................. 455/456 |
| 6,148,291 A | * | 11/2000 | Radican | ....................... 705/28 |
| 6,226,590 B1 | | 5/2001 | Fukaya et al. | |
| 6,226,591 B1 | | 5/2001 | Okumura et al. | |
| 6,266,008 B1 | | 7/2001 | Huston et al. | |
| 6,269,303 B1 | | 7/2001 | Watanabe et al. | |
| 6,281,797 B1 | * | 8/2001 | Forster et al. | ........... 340/572.3 |
| 6,331,825 B1 | * | 12/2001 | Ladner et al. | .............. 340/988 |
| 6,339,397 B1 | * | 1/2002 | Baker | .................... 342/357.07 |
| 6,429,810 B1 | * | 8/2002 | De Roche | .............. 342/357.07 |
| 6,483,434 B1 | * | 11/2002 | UmiKer | .................... 340/572.1 |
| 6,519,529 B2 | * | 2/2003 | Doyle | ........................ 701/213 |
| 2002/0120475 A1 | * | 8/2002 | Morimoto | ...................... 705/4 |

* cited by examiner

*Primary Examiner*—Michael J. Zanelli

(57) ABSTRACT

A system and method of monitoring cargo container mobility and efficiency for facilitating post-transit analysis of cargo shipments. The system and method of monitoring cargo container mobility and efficiency includes a mobile location data module which is couplable to a cargo container and is used for determining and recording position and time data on an interval basis as well as supplemental information, a data processing means for processing the position and time data into efficiency track information for post-transit analysis, and a data presentation means for presenting the efficiency track information to a user for facilitating post-transit analysis.

42 Claims, 4 Drawing Sheets

Figure 5
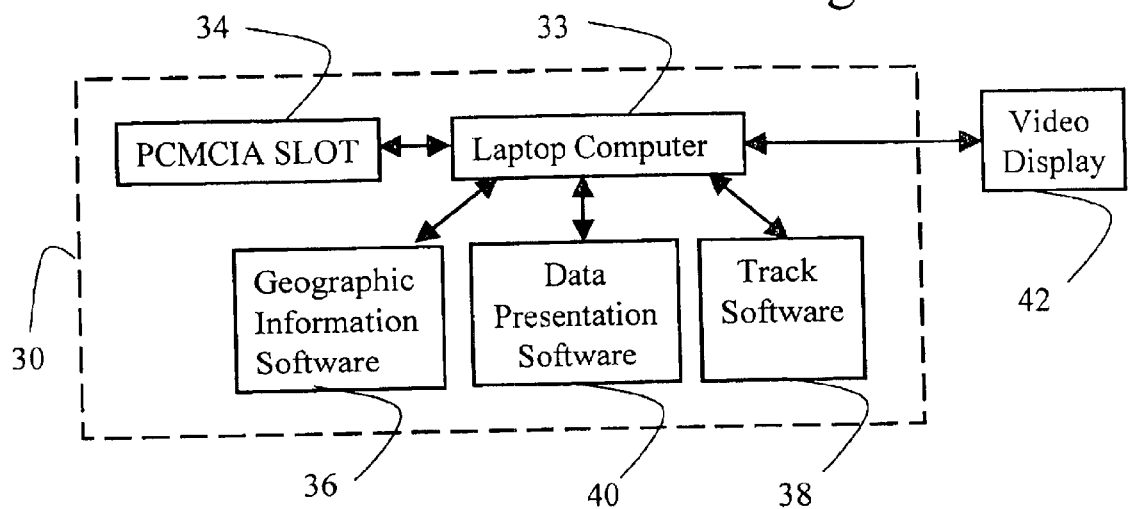
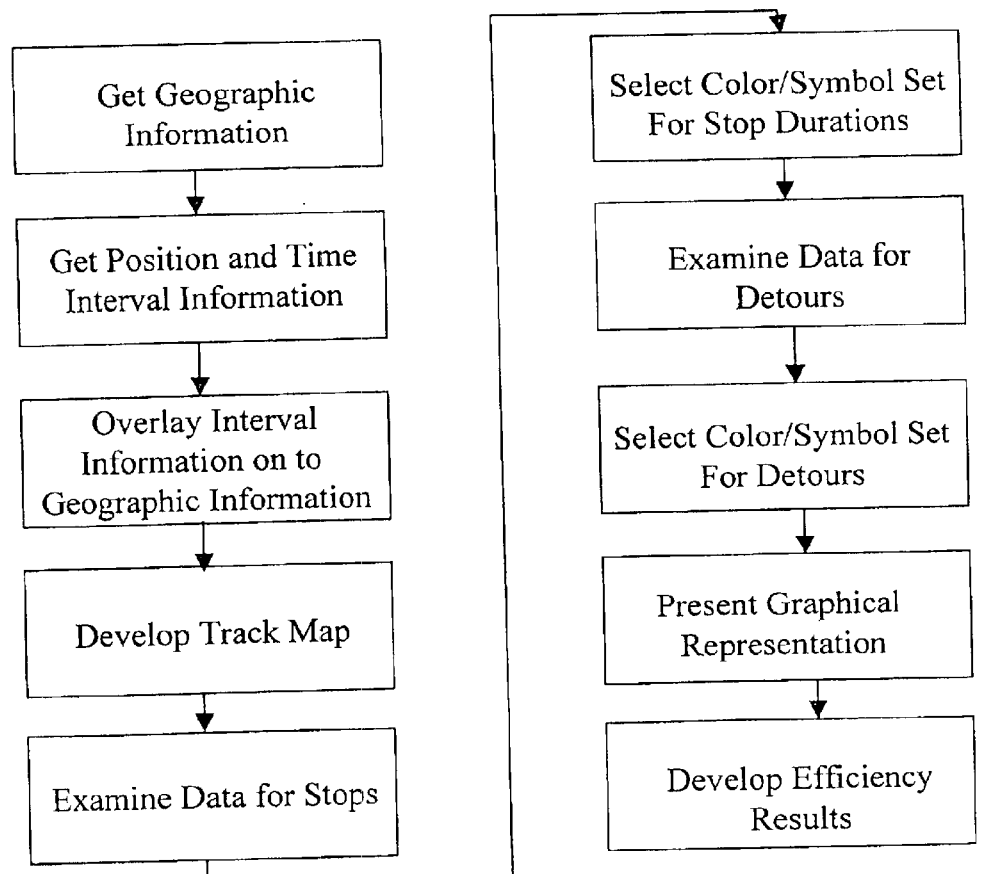
Figure 6

SYSTEM AND METHOD OF MONITORING CARGO CONTAINER MOBILITY AND EFFICIENCY

BACKGROUND OF THE INVENTION

1. Field of the Invention

The present invention relates to navigation aids and surveillance systems and more particularly pertains to a new system and method of monitoring cargo container mobility and efficiency for facilitating post-transit analysis of cargo shipments.

2. Description of the Prior Art

The use of navigation aids and surveillance systems for traffic system is known in the prior art. These systems are focused towards providing pre-transit route planning and real time navigation assistance.

While these devices fulfill their respective, particular objectives and requirements, the aforementioned patents do not disclose a new system and method of monitoring cargo container mobility and efficiency. The inventive device includes a mobile location data module which is couplable to a cargo container and is used for determining and recording position and time data on an interval basis as well as recording supplemental information, a data processing means for processing the position and time data into efficiency track information for post-transit analysis, and a data presentation means for presenting the efficiency track information to a user for facilitating post-transit analysis.

In these respects, the system and method of monitoring cargo container mobility and efficiency according to the present invention substantially departs from the conventional concepts and designs of the prior art, and in so doing provides an apparatus primarily developed for the purpose of facilitating post-transit analysis of cargo shipments.

SUMMARY OF THE INVENTION

Changes in the modern business environment continue to place greater stresses on the transportation of goods. Shipping departments have become sophisticated logistic management centers for supporting virtual warehousing and just in time systems. Tools for pre-planning transit routes as well as real time navigation aides are well known in the prior art.

Part of any successful management system is the use of measured data to validate performance against the predetermined plan. This measured data feedback is a valuable part of any cargo transit system whether rail, tractor-trailer, delivery truck, ship, or inter-modal systems are used, however its greatest value may be realized in the tractor-trailer context where as large amount of autonomy is given to individual drivers. Unscheduled stops can result in increased fuel consumption, loss of goods being transported, or increased probabilities of accidents by a driver completing a leg of a preplanned route at a later hour than scheduled. Real time monitoring of the drivers performance can be cost prohibitive and provides no substantially benefits to post transit analysis.

The mobile location data module of the system for monitoring cargo container mobility and efficiency can be coupled to a tractor, trailer, shipping container, rail car, delivery truck, or any other container used in conjunction with the transportation of goods. Monitoring the post-transit data can provide a means of identifying specific drivers who are increasing overall costs and risk of loss, as well as those drivers who responsibly stay within the boundaries of the preplanned route and schedule.

The data collected can also be used to determine average velocity vectors to evaluate the true duration of specific legs of a preplanned route and validate the legs against the predetermined plan.

In view of the foregoing disadvantages inherent in the known types of navigation aids and surveillance systems now present in the prior art, the present invention provides a new system and method of monitoring cargo container mobility and efficiency construction wherein the same can be utilized for facilitating post-transit analysis of cargo shipments.

The general purpose of the present invention, which will be described subsequently in greater detail, is to provide a new system and method of monitoring cargo container mobility and efficiency apparatus and method which has many novel features that result in a new system and method which is not anticipated, rendered obvious, suggested, or even implied by any of the prior art navigation aids and surveillance systems, either alone or in any combination thereof.

To attain this, the present invention generally comprises a mobile location data module which is couplable to a cargo container and is used for determining and recording position and time data on an interval basis, a data processing means for processing the position and time data into efficiency track information for post-transit analysis, and a data presentation means for presenting the efficiency track information to a user for facilitating post-transit analysis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new system and method of monitoring cargo container mobility and efficiency apparatus and method which has many of the advantages of the navigation aids and surveillance systems mentioned heretofore and many novel features that result in a new system and method of monitoring cargo container mobility and efficiency which is not anticipated, rendered obvious, suggested, or even implied by any of the prior art navigation aids and surveillance systems, either alone or in any combination thereof.

Still another object of the present invention is to provide a new system and method of monitoring cargo container mobility and efficiency for facilitating post-transit analysis of cargo shipments.

Yet another object of the present invention is to provide a new system and method of monitoring cargo container mobility and efficiency which includes a mobile location data module which is couplable to a cargo container and is used for determining and recording position and time data on an interval basis, a data processing means for processing the position and time data into efficiency track information for post-transit analysis, and a data presentation means for presenting the efficiency track information to a user for facilitating post-transit analysis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic functional interconnect diagram of the data processing and data presentation means of the present invention.

FIG. 6 is a schematic functional process flow of the data processing means present invention.

DESCRIPTION OF THE PREFERRED EMBODIMENT

Figure 1:
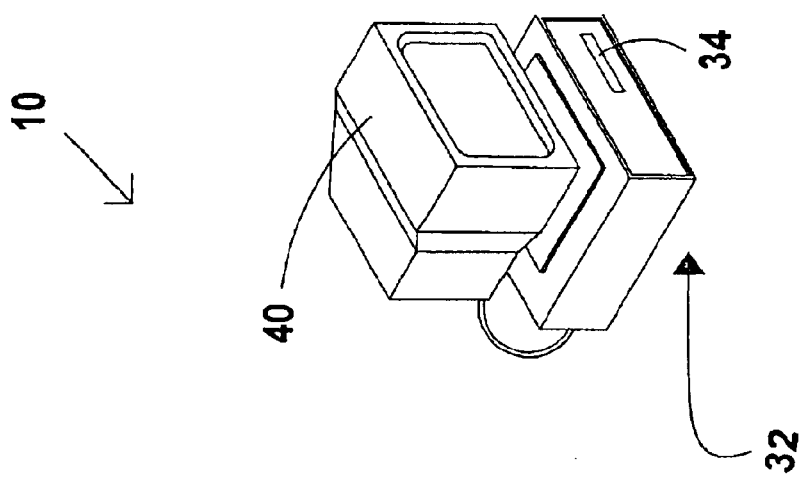
FIG. 1 is a schematic perspective view of a new system of monitoring cargo container mobility and efficiency according to the present invention.
Figure 1:
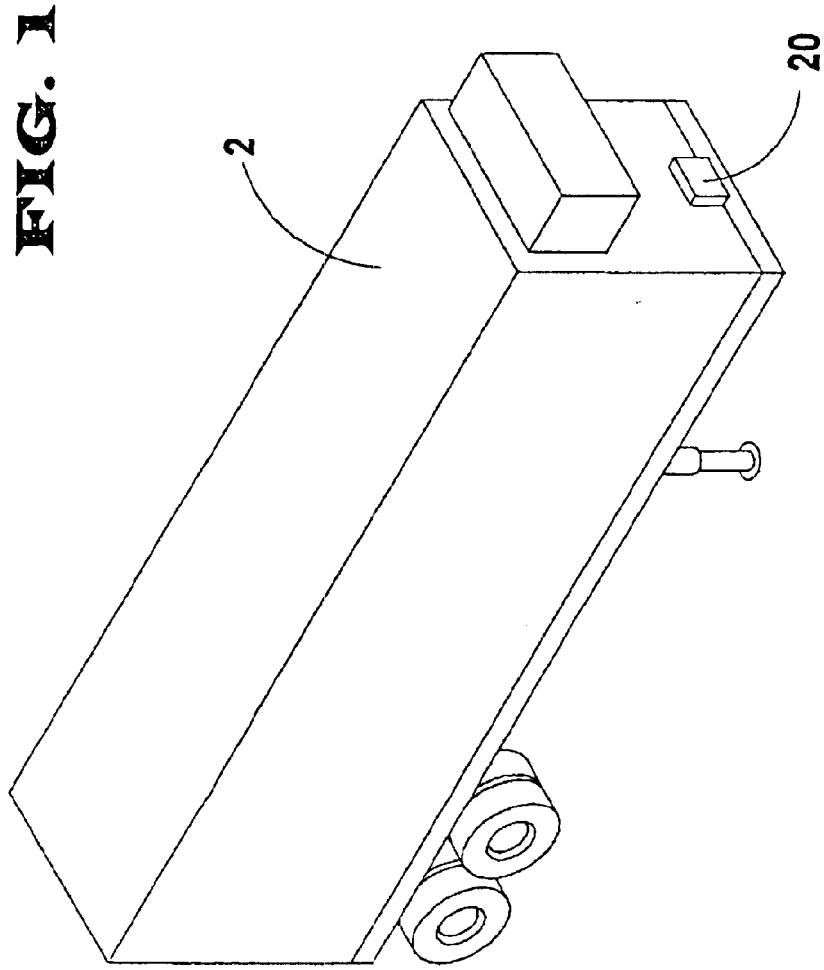
Figure 2:
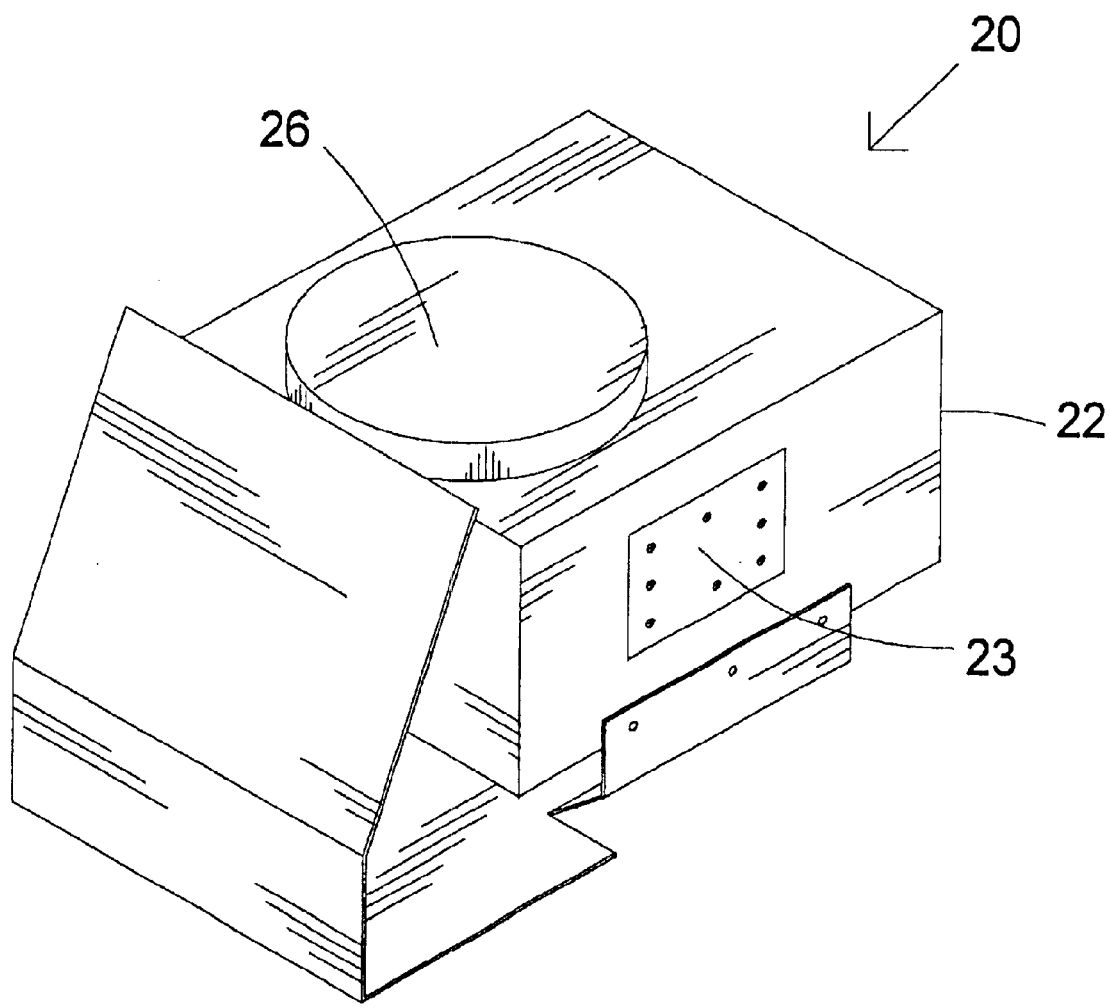
FIG. 2 is a schematic perspective view of the mobile location data module of the present invention.
Figure 3:
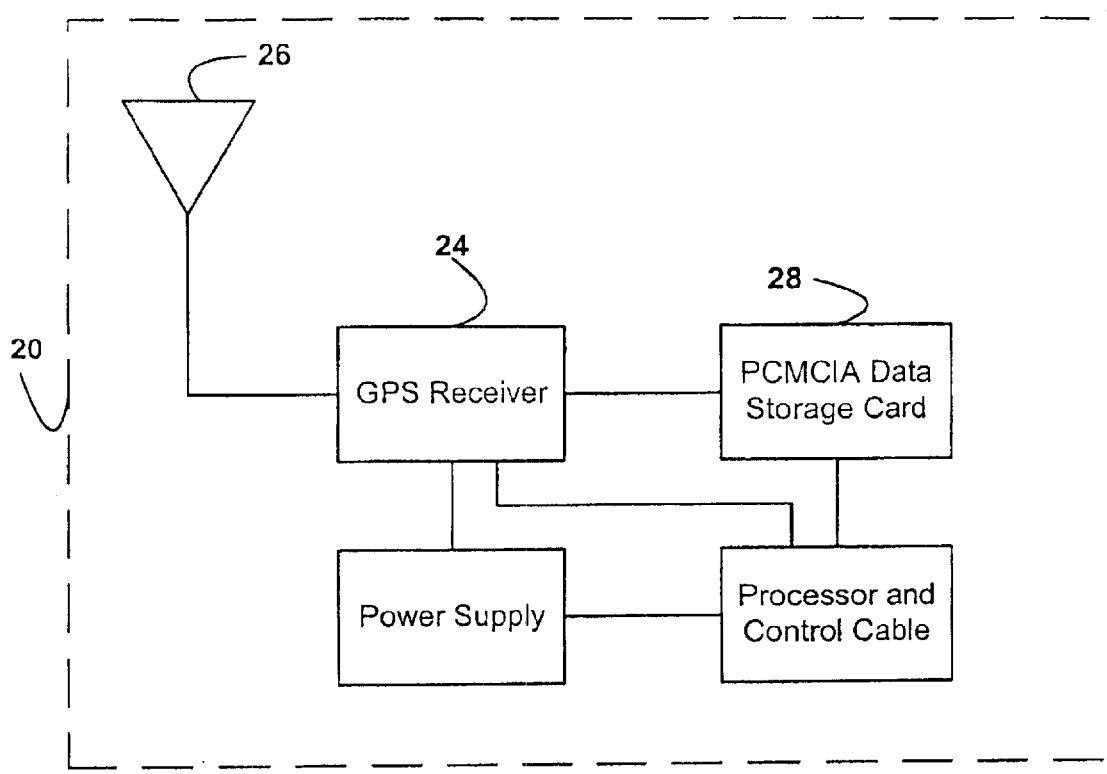
FIG. 3 is a schematic functional interconnect diagram of the mobile location data module of the present invention.
Figure 4:
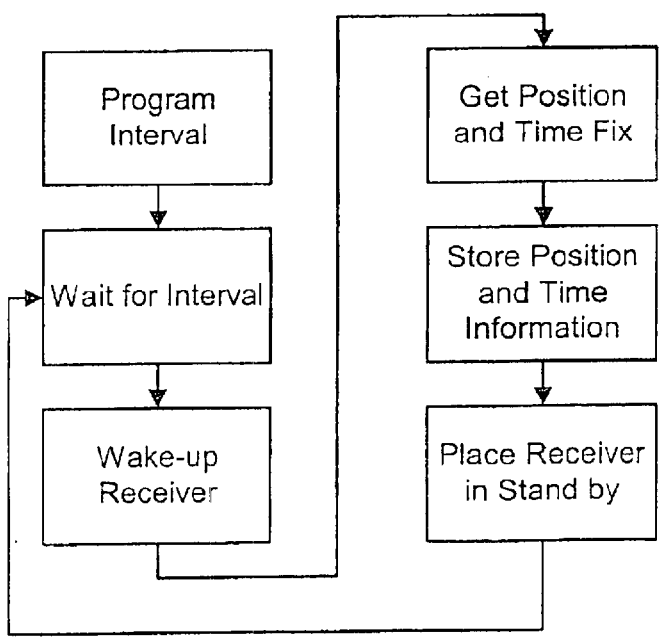
FIG. 4 is a schematic functional process flow diagram of the mobile location data module of the present invention.

With reference now to the drawings, and in particular to FIGS. 1 through 6 thereof, a new system and method of monitoring cargo container mobility and efficiency embodying the principles and concepts of the present invention and generally designated by the reference numeral 10 will be described.

As best illustrated in FIGS. 1 through 6, the system and method of monitoring cargo container mobility and efficiency 10 generally comprises a mobile location data module 20, a data processing means 30, and a data presentation means 40.

The mobile location data module 20 is couplable to a cargo container 2. The mobile location data module 20 is used for determining and recording position and time data on an interval basis.

The mobile location data module 20 preferably further comprises a housing 22, at least one global positioning system (GPS) receiver 24, at least one antenna 26, and a compact flash card 28. While the compact flash card is strongly preferred other storage media, such as PCMCIA data storage cards, smart media cards, or other similar devices, can be effectively used.

The housing 22 is couplable to the cargo container and includes an interior space. The housing 22 preferably includes an access panel 23, which provides access into the interior space.

The GPS receiver 24 determines a current position of the cargo container 2 on an interval basis. The GPS receiver 24 is preferably positioned substantially within the housing 22 such that the housing 22 provides protection to the GPS receiver 24 from an external environment. Alternately, the GPS receiver may be positioned within the antenna housing or the data presentation means.

The antenna 26 is operationally coupled to the GPS receiver 24 and is used to facilitate reception of GPS signals by the GPS receiver 24.

The compact flash card 28 is operationally couplable to the GPS receiver 24 for storing position and time data. The compact flash card 28 is preferably positionable within the housing 22. The compact flash card 28 may be removable from the housing 22 through the access panel 23.

In an embodiment, supplemental data input devices are also operationally coupled to said compact flash for recording events such as cargo loading, cargo unloading, change in quantity and other related data. The supplemental data input devices may be operationally coupled to doors, flow meters, pressure gauges, volume sensors or weight sensors.

In a further embodiment, the data processing means 30 comprises a personal computer 32, which includes a compact flash reader 34 for receiving and operationally coupling to compact flash cards 28. A geographic information data software 36 provides geographic information of an area transited by the cargo container 20. A track software 38 creates an overlay of position and time information from the compact flash card 28 for facilitating post-transit analysis.

In another embodiment, the data processing means 30 comprises a laptop computer 33 which includes a compact flash reader 34 for receiving and operationally coupling to compact flash cards 28. A geographic information data software 36 provides geographic information of an area transited by the cargo container 20. A track software 38 creates an overlay of position and time information from the compact flash card 28 for facilitating post-transit analysis.

In still another embodiment, a cellular modem system provides an operational interconnection between the data processing means 30 and the mobile location data module 20, for facilitating in transit updates for analysis. While a cellular modem system is preferred for providing in transit updates, other systems such as a radio link, electrical cables, optical cables, and infrared links can be used to operationally interconnect the mobile location data module 20, and the data processing means 30, without removal of the compact flash card.

In an embodiment the data presentation means 40 comprises a video monitor 42 is used for displaying the geographic information and position and time information overlay.

In a further embodiment, the video monitor 42 includes a multi-color display such that stops during transit longer in duration than one interval are highlighted in a unique color to facilitate post transit analysis.

In still a further embodiment, the video monitor 42 includes a multi symbol display such that stops during transit longer in duration than one interval are highlighted in a unique symbol to facilitate post transit analysis.

In use, a cargo container to be monitored is selected. The mobile location data module is coupled to the cargo container. The PCMCIA card is connected to the GPS receiver within the housing to record position and time information from the GPS receiver.

An interval is selected for determining the duration of time between position and time information determinations by the GPS receiver. Preferably, the interval has a duration between one and 3600 seconds inclusive. That is to say that the interval between determinations may be set to anything between one second and one hour. The shorter the duration the smaller the granularity of the data, and the more accurately the data can be used to determine unscheduled stops, velocity during legs of the preplanned route and overall route taken. However, the shorter the interval selected, the more storage space required in the compact flash card.

The cargo container is then released for transiting to its destination. The route may be preplanned in detail, or only the origin and destination points may be known.

After arrival at the destination point, the compact flash card is removed from the mobile location data module and is coupled to a processing means. Typically the processing means will either be a personal computer or a laptop. However, other computing means may be used such as PDA, programmable calculators, or scheduling tools.

The recorded position and time information for each interval is then overlayed by a track software with geographic information provided by a geographic information software operationally available to the processing means.

This overlayed information is then presented to the user for analysis. Preferably the presentation is performed by graphically displaying the information on a video monitoring using multiple colors, symbols, or both to highlight areas where unauthorized stops, or detours may have occurred.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for monitoring cargo container mobility and efficiency for use in conjunction with various modes of transit comprising:

a mobile location data module couplable to a cargo container, said mobile location data module determining and recording position and time data on an interval basis;

a data processing means for processing said position and time data into efficiency track information for post-transit analysis;

a data presentation means for presenting said efficiency track information to a user for facilitating post-transit analysis;

said data processing means further comprises a personal computer having a data input means, said personal computer having a geographic information software for providing geographic information of an area transited by the cargo container;

said data input means is a data card reader selected from the group consisting of a personal computer memory card international association (PCMCIA) data storage slot, a smart media card reader, and a compact flash card reader, said data card reader being for facilitating operationally coupling to a programmable storage device.

2. The system of claim 1, wherein said mobile location data module further comprises:

a housing couplable to a cargo container;

a position locating means for determining a current position of the cargo container, said position locating means being positioned substantially within said housing;

a data logging and storage means for recording position and time information from said position location means, said data logging and storage means being operationally coupled to said position locating means, said data logging and storage means being positioned substantially within said housing.

3. The system of claim 2, wherein said position locating means is a position location system selected from the group consisting of Global Positioning System (GPS), Long Range Navigation (LORAN), and Inertial Navigation System (INS).

4. The system of claim 2, wherein said position locating means further comprises at least one global positioning system (GPS) receiver, said GPS receiver being positioned substantially within said housing, said GPS receiver being operationally coupled to at least one antenna member for facilitating reception of GPS signals.

5. The system of claim 2, wherein said data logging and storage means further comprises a programmable storage device selected from the group consisting of a personal computer memory card international association (PCMCIA) data storage card, a compact flash card, and a smart media card.

6. The system of claim 5, wherein said programmable storage device being for storing position and time information from said position location means on an interval basis, said programmable storage device facilitating transportation of said position and time information from said position location means to said data processing means in a nonvolatile format.

7. The system of claim 6, wherein said programmable storage device being for supplemental data from said cargo container in addition to said position and time information.

8. The system of claim 7, wherein said supplemental data further comprises a cargo loading input, a cargo unloading input, and a cargo quantity input for recording changes in cargo status and time of change information.

9. The system of claim 1, wherein said data processing means further comprises track software for overlaying said position and time data against said geographic information.

10. The system of claim 1, wherein said data processing means further comprises a laptop computer having a data input means, said laptop computer having a geographic information software for providing geographic information of an area transited by the cargo container.

11. The system of claim 10, wherein said data processing means further comprises track software for overlaying said position and time data against said geographic information.

12. The system of claim 1, wherein said data presentation means comprises a monitor for displaying a graphic representation of geographic information of an area transited by the cargo container and an overlay of said position and time data recorded by the mobile location data module.

13. The system of claim 12, wherein said monitor displays said position information in multiple colors such that identical position data recorded over multiple intervals is highlighted whereby stops during transit can be identified by the user.

14. The system of claim 13, wherein said monitor displays a graphic representation of supplemental information for analyzing cargo changes in reference to said position and time data.

15. The system of claim 1, wherein a data logging and storage means being operationally couplable to said data processing means via a coupling means such that stored information may be transferred to said data processing means from said data logging and storage means.

16. The system of claim 15, wherein said coupling means being a coupling means selected from the group consisting of an electrical signal connection, an optical signal connection, a radio link, an infrared link, and a cellular modem system.

17. The system of claim 1, wherein said mobile location data module further comprises:
    a position locating means for determining a current position of the cargo container;
    a data logging and storage means for recording position and time information from said position location means, said data logging and storage means being operationally coupled to said position locating means;
    an antenna member operationally coupled to said position locating means for facilitating reception of radio signals.

18. The system of claim 17 wherein said position locating means being positioned substantially within said antenna member for minimizing losses from said antenna member to said position locating means.

19. The system of claim 17 wherein said position locating means being positioned substantially within said data presentation means for optimizing power transfer and data interconnections between said data presentation means and said position locating means.

20. A system for monitoring cargo container mobility and efficiency for use in conjunction with various modes of transit comprising:
    a mobile location data module couplable to a cargo container, said mobile location data module determining and recording position and time data on an interval basis;
    a data processing means for processing said position and time data into efficiency track information for post-transit analysis;
    a data presentation means for presenting said efficiency track information to a user for facilitating post-transit analysis;
    said mobile location data module further comprises:
        a housing couplable to a cargo container;
        a position locating means for determining a current position of the cargo container, said position locating means being positioned substantially within said housing;
        a data logging and storage means for recording position and time information from said position location means, said data logging and storage means being operationally coupled to said position locating means, said data logging and storage means being positioned substantially within said housing;
        wherein said position locating means further comprises at least one global positioning system (GPS) receiver, said GPS receiver being positioned substantially within said housing, said GPS receiver being operationally coupled to at least one antenna member for facilitating reception of GPS signals;
        wherein said data logging and storage means further comprises a compact flash card;
        wherein said compact flash card being for storing position and time information from said position location means on an interval basis, said compact flash card facilitating transportation of said position and time information from said position location means to said data processing means in a nonvolatile format;
        wherein said compact flash card being for supplemental data from said cargo container in addition to said position and time information;
        wherein said supplemental data further comprises a cargo loading input, a cargo unloading input, and a cargo quantity input for recording changes in cargo status and time of change information;
    said data processing means further comprises a personal computer having a data input means, said personal computer having a geographic information software for providing geographic information of an area transited by the cargo container;
    said data input means is a compact flash card reader, said compact flash card reader being for facilitating operationally coupling to a compact flash card;
    wherein said data processing means further comprises track software for overlaying said position and time data against said geographic information; and
    wherein said data presentation means comprises a monitor for displaying a graphic representation of geographic information of an area transited by the cargo container and an overlay of said position and time data recorded by the mobile location data module.

21. The system of claim 20, wherein said monitor displays said position information in multiple colors such that identical position data recorded over multiple intervals is highlighted whereby stops during transit can be identified by the user.

22. The system of claim 20, wherein said monitor displays a graphic representation of supplemental information for analyzing cargo changes in reference to said position and time data.

23. A method of monitoring cargo container mobility and efficiency for use in conjunction with various modes of transit comprising:
    selecting a cargo container to be monitored for post-transit analysis;
    providing a position locating means for determining a current location on an interval basis;

coupling said position locating means to the cargo container;

transiting said cargo container;

collecting location and time information from said position locating means;

removing a data logging and storage means from said position locating means for facilitating transferring location and time information to said processing means;

processing said location and time information into processed data;

presenting processed data to a user for post transit analysis.

24. The method of claim 23, wherein said step of providing a position locating means further comprises providing a navigation system selected from the group consisting of global positioning system (GPS), long range navigation (LORAN), and inertial navigation system (INS).

25. The method of claim 23, wherein said step of providing a position locating means further comprises:

providing at least one global positioning system (GPS) receiver;

providing at least one antenna operationally coupled to said GPS receiver, said antenna facilitating reception of GPS signals by said GPS receiver;

providing a data logging and storage means for recording position and time information from said GPS receiver.

26. The method of claim 25, wherein said step of providing at least one GPS receiver further comprises:

determining an interval for said GPS receiver to be inactive between position and time determinations;

providing a timing means for measuring said interval;

programming said timing means for said interval.

27. The method of claim 26, wherein said step of determining an interval further comprises selecting an interval period having a duration between 1 and 3600 seconds inclusive.

28. The method of claim 25 wherein said step of providing a data logging and storage means for recording position and time information further comprises recording supplemental data from said cargo container.

29. The method of claim 28 further comprising providing an interconnect means for operationally coupling said data logging and storage means with a data processing means for facilitating the transfer of information.

30. The method of claim 29 wherein said step of providing an interconnect means further comprises providing an interconnect means selected from the group consisting of a radio frequency link, an electrical cable, an optical cable, an infrared link, and a cellular modem system.

31. The method of claim 29, wherein said step of providing an interconnect means further comprises providing a cellular modem system for facilitating a wireless interconnection between said data logging and storage means and said data processing means.

32. The method of claim 31, further comprising providing in transit transfers of information between said data logging and storage means and said data processing means for providing periodic updates for analysis during transit.

33. The method of claim 28 wherein said supplemental data further comprises a cargo loading input, a cargo unloading input, and a cargo quantity input for recording changes in cargo status and time of change information.

34. The method of claim 25, wherein said step of providing a data logging and storage means for recording position and time information from said GPS receiver comprises providing a data storage card selected from the group consisting of a personal computer memory card international association (PCMCIA) data storage card a smart media card, and compact flash card, said data storage card being for storing and transporting said position and time information in a substantially nonvolatile format.

35. The method of claim 25, wherein said step of providing a data logging and storage means for recording position and time information from said GPS receiver comprises providing a compact flash card for storing and transporting said position and time information in a substantially nonvolatile format.

36. The method of claim 23, wherein said step of removing a data logging and storage means further comprises removal of a compact flash card from said position locating means for transferring said information in a nonvolatile form.

37. The method of claim 23, wherein said step of collecting location and time information further comprises providing an interconnect means for operationally coupling said data logging and storage means with a data processing means for facilitating the transfer of information.

38. The method of claim 23, wherein said step of processing said location and time information further comprises:

providing geographic information data relevant to the route transited by said cargo container;

overlaying said location and time information for each interval against said geographic information data for plotting a course and velocity vectors of said cargo container; and developing a representation of location information repeating for multiple intervals.

39. The method of claim 38, wherein said step of presenting processed data further comprises displaying said geographic information and said overlayed location and time information on a video monitor for review and analysis by the user.

40. The method of claim 39, wherein said step of displaying said geographic information and said overlayed location and time information further comprises displaying said information in multiple colors such that stops of a duration longer than a determined interval in a unique color for facilitating analysis by the user.

41. The method of claim 39, wherein said step of displaying said geographic information and said overlayed location and time information further comprises displaying said information in multiple symbols such that stops of a duration longer than a determined interval in a unique symbol for facilitating analysis by the user.

42. The method of claim 39, wherein said step of displaying said geographic information further comprises displaying supplemental information in reference to said location and time information for facilitating analysis of cargo changes.

* * * * *